E. GERBER.
SEED-PLANTERS.

No. 194,424. Patented Aug. 21, 1877.

WITNESSES:
E. Wolff
J. H. Scarborough

INVENTOR:
E. Gerber
BY Munn
ATTORNEYS.

N. PETERS, PHOTO-LITHOGRAPHER, WASHINGTON, D. C.

UNITED STATES PATENT OFFICE.

EMANUEL GERBER, OF LA FAYETTE, GEORGIA.

IMPROVEMENT IN SEED-PLANTERS.

Specification forming part of Letters Patent No. 194,424, dated August 21, 1877; application filed April 2, 1877.

*To all whom it may concern:*

Figure 1:
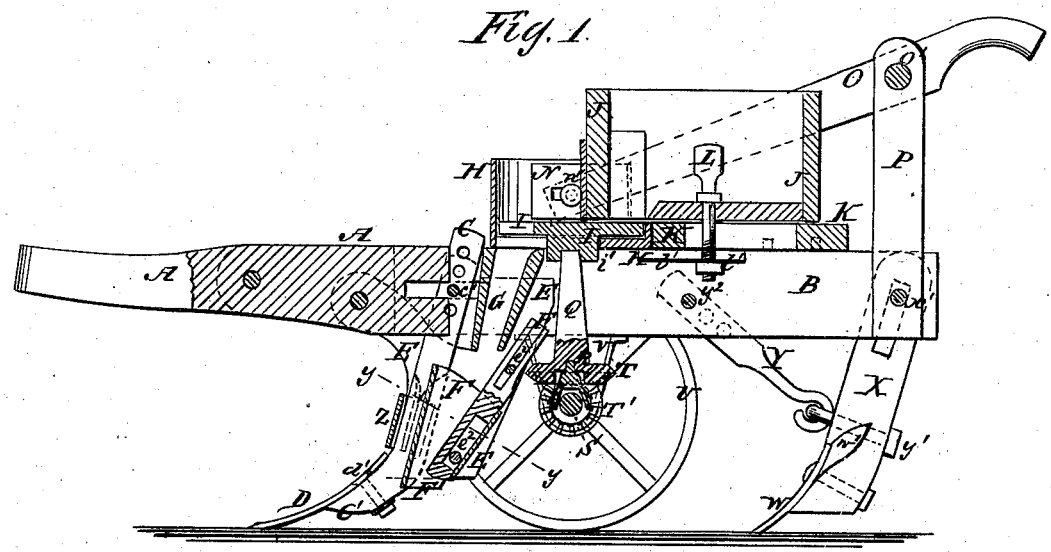
Figure 2:
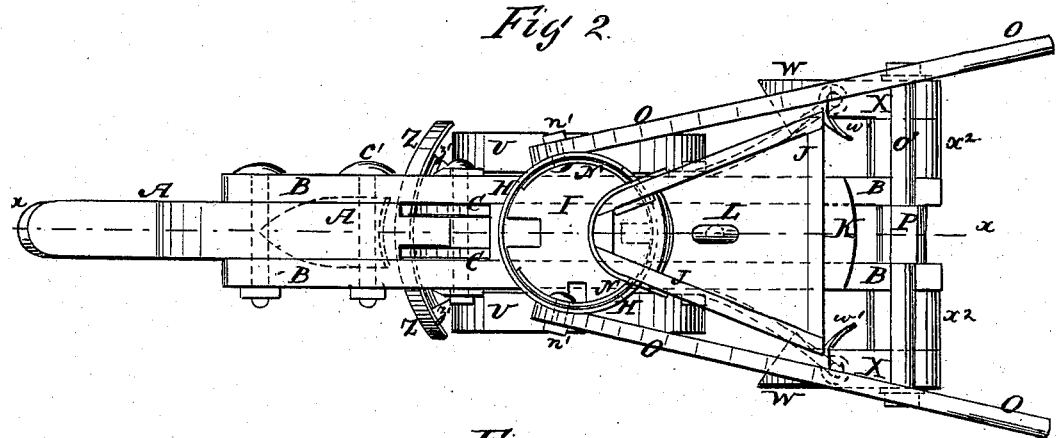
Figure 3:
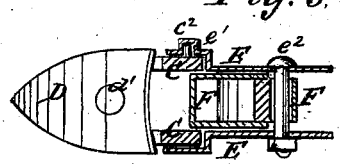

Be it known that I, EMANUEL GERBER, of La Fayette, in the county of Walker and State of Georgia, have invented a new and useful Improvement in Seed-Planters, of which the following is a specification:

In the accompanying drawing, Figure 1 is a vertical longitudinal section of my improved planter, taken through the line $x$ $x$, Fig. 2. Fig. 2 is a top view of the same. Fig. 3 is a detail section, taken through the line $y$ $y$, Fig. 1.

Similar letters of reference indicate corresponding parts.

The object of this invention is to furnish an improved machine for planting corn and other seed, which shall be so constructed that it may be readily arranged to plant the seed at any desired depth, at any desired distance apart, and any desired number of kernels in a hill, and which shall be simple in construction and convenient in use.

The invention will first be described in connection with the drawing, and then pointed out in the claims.

Referring to the drawing, A is the draw-bar, the rear part of which is inserted between and bolted to the forward parts of the beams B. In the sides of the rear part of the draw-bar A are formed long notches, to serve as slots to receive the upper parts of the standard C of the opening-plow D, where they are secured in place by a bolt, $c^1$, that passes through them and through a longitudinal slot in the beams B and draw-bar A, so that by loosening the said bolt the upper ends of the standard C may be moved forward or back to adjust the pitch of the plow D, as required. Several holes are formed in the standard C to receive the bolt $c^1$, so that the plow D can be raised and lowered to work at any desired depth in the ground, or raised entirely above the ground, if desired. The lower parts of the standard C are bent forward, and their ends are welded together to form a seat for the plow D, and a slot to receive the bolt $d'$, that secures said plow D in place.

E represents brace-plates, the upper ends of which are attached to the inner sides of the forward parts of the beams B. The brace-plates E pass down upon the opposite sides of the standard C, and have shoulders formed in them for the rear edges of the parts of the said standard to rest against, to support the draft-strain. In the inner side of the forward part of one or both of the brace-plates E is formed a groove, $e^1$, to receive a pin, $c^2$, formed upon or attached to one branch of the standard C, to serve as a stop to prevent the lower part of the standard from swinging forward, and to serve as a fulcrum or pivot to the standard when the upper end is moved forward or back.

Between the rear parts of the brace-plates E is placed the lower part of the conductor-spout F, the rear part of which is slotted longitudinally to receive the bolts $e^2$ $e^2$, which pass through holes in said brace-plates E, so that the said conductor-spout can be adjusted closer to or farther from the ground, according as the seed is to be planted deeper or shallower.

The rear side of the adjustable spout F projects upward at the rear side of the upper or stationary spout G, to prevent the seed from escaping when the spout F is lowered. The spout G is secured to and between the beams B, with its upper end just below the discharge-opening in the forward part of the bottom of the cup H. The cup H is made cylindrical in form, to receive the dropping wheel or plate I that is attached to the beams B, and has the rear part of its rim cut away to receive the forward corner of the seed-hopper J, so that the seed from said hopper may pass through a hole in the bottom, to rest upon the part of the dropping wheel or plate I, fill its dropping-holes, and be carried out and dropped through the spouts G F to the ground.

The bottom of the hopper J is raised to a level with the top of the dropping wheel or plate I by a false bottom, K, interposed between it and the top of the beams B, and kept in place by dowel-pins attached to said beams. The false bottom K is slotted longitudinally to receive the bolt L, which passes through a hole in the bottom of the hopper J, through the slot in the false bottom K, and screws into a nut, $l'$, placed between the beams B, which keep it from turning, and beneath the cleats $b'$ attached to said beams B, which keep it from rising. The bolt L thus secures the hopper in place adjustably and detachably.

The lower edges of the forward part of the hopper J that are over the dropping wheel or plate I are notched, to prevent the kernels from being broken while being carried out by said dropping wheel or plate, and the spaces thus formed are covered by leather or other suitable material, to prevent any more seed from being carried out by said plate than enough to fill its dropping-holes.

The wheel or plate I is made with one, two, or more dropping-holes, according to the required distance apart of the hills, and the number of kernels to be dropped at a time depends upon the size of the dropping-holes and the thickness of the plate.

The planters are designed to be furnished with sets of dropping-plates I of different thicknesses.

The number of kernels dropped for a hill may also be regulated by adjusting the hopper J so that its forward end may project to a greater or less distance over the dropping wheel or plate I, as, for instance, when the hopper is far enough forward for the opening in the forward end of its bottom to cover the dropping-holes of said plate I, it will allow the said dropping-holes to be entirely filled with kernels; but when the hopper is drawn back, so that its discharge-hole projects over only a part of the dropping-holes, the said dropping-holes will receive a less number of kernels.

N are plates, which are curved to correspond with the curvature of the rim of the cup H, are placed against the sides of said rim, with their lower edges resting upon or just above the dropping wheel or plate I, and their rear ends resting against the sides of the hopper J, where they are secured in place by bolts $n'$ passing through them, through the rim of the cup H, and through the forward ends of the handles O. The plates N are slotted longitudinally to receive the bolts $n'$, so that their rear ends may be kept against the sides of the hopper J, however said hopper may be adjusted. The rear parts of the handles O are attached to the ends of the round O', the middle part of which passes through and is secured to the upper end of the standard P. The lower end of the standard P is secured to and between the rear ends of the beams B.

The dropping wheel or plate I has a hub, $i'$, formed upon the center of its lower side, which passes through a hole in the center of the bottom of the cup H, and has a square hole in its lower end to receive the square upper end of the vertical shaft Q.

The shaft Q revolves upon a pivot-arm, R, formed upon and projecting from the bearings for the journal of the horizontal shaft S. To the lower end of the shaft Q is attached a bevel-gear wheel, T, the teeth of which mesh into the teeth of a smaller gear-wheel, T', attached to the horizontal shaft S, or to the hub of one of the wheels U, attached to the ends of the said shaft S. The horizontal shaft S revolves in bearings V attached to the beams B.

The wheels U roll upon the ground at the sides of the furrow opened by the plow D, and thus turn the dropping wheel or plate I. The furrow is filled and the seed covered by the plows W, which have wings $w'$ formed upon their inner edges to push the soil inward. The plows W are attached to the lower ends of the standards X, the upper parts of which are slotted longitudinally to receive the bolts $x^1$. The bolts $x^1$ also pass through the beams B, and through the blocks $x^2$ interposed between the said standards X and the said beams B.

By using blocks $x^2$ of different thicknesses the plows W may be adjusted at any desired distance apart.

The draft-strain upon the standards X is sustained by brace-rods Y, the rear ends of which are connected with the said standards X by eyebolts $y^1$, and their forward ends are secured to the beams B by bolts $y^2$. Several holes are formed in the braces Y to receive the bolts $y^2$, so that said braces can be adjusted to correspond with the adjustment of the standards X.

Z is a bent or curved plate, placed in front of the standard C, and attached to the lower ends of the bars $z'$, which pass up at the sides of the brace-plates E, and have holes in their upper ends to receive the bolt $c^1$, so that the said plate Z may be supported by the said bolt $c^1$.

The plate Z is designed to push back lumps or clods that would impede the wheels U and render their action irregular.

Having thus described my invention, I claim as new and desire to secure by Letters Patent—

1. The combination of the standard C, made of two bars welded together at their lower ends, and having holes in their upper ends, and the shouldered and grooved brace-plates E, with each other, and the draw-bar A and the beams B, substantially as herein shown and described.

2. The combination of the adjustable conductor-spout F, having its rear side slotted and extended upward, with the brace-plates E, the standard C, and the stationary conductor-spout G, substantially as herein shown and described.

3. The combination of the triangular hopper J, the slotted false bottom K, the bolt and nut L $l'$, and the cleats $b'$, with the beams B, the cup H, and the dropping wheel or plate I, substantially as herein shown and described.

4. The combination of the slotted plates N with the cup H, the hopper J, and the dropping wheel or plate I, substantially as herein shown and described.

EMANUEL GERBER.

Witnesses:
RICHARD F. MIZEL,
H. W. CENTER.